United States Patent Office 2,936,231
Patented May 10, 1960

2,936,231

RARE-EARTH METAL FISSION PRODUCTS FROM LIQUID U-Bi

Richard H. Wiswall, Brookhaven, N.Y., assignor to the United States of America as represented by the United States Atomic Energy Commission No Drawing. Original application May 27, 1955, Serial No. 511,810, now Patent No. 2,840,464, dated June 24, 1958. Divided and this application February 19, 1958, Serial No. 716,253

3 Claims. (Cl. 75—84.1)

The present invention relates to a process for removing metal selectively from liquid metal compositions. This application is a division of my application, Serial Number 511,810, filed May 27, 1955, now Patent No. 2,840,464.

It has been proposed to produce heat from fissionable materials by dissolving them in liquid metal and exposing them to neutron irradiation. The fissionable metals have low solubility in liquid metal compositions having the needed combination of properties for use in connection with nuclear reactors and they are therefore present in such compositions in low concentration. One result of the irradiation of these fissionable metals by neutrons is the production of metallic and other fission products which remain in the liquid metal. The concentration of fission products is low and should preferably be kept at a minimum in order to prevent the wasteful capture of neutrons. One process for their removal is described in Patent Number 2,758,023. The present invention is an improvement over that disclosed in the Bareis patent.

The capability of fused salts to act as solvents for metals is well known. It is also known that the solubility may be quite large as in the case of a metal dissolving in its own fused halide. Smaller, though significant, solubilities have been measured in systems of a salt in equilibrium with a foreign metal. The solbility of cadmium in manganous chloride is an example. The distribution of metal between salt and metal is even less predictable if the metal is present in contact with the salt, not in the pure state, but in the form of a dilute solution in another metal such as bismuth. If the behavior of metals in dilute solution in liquid metal were that predicted for normal behavior in a solution, the ratio of the concentration of a particular metal in the salt phase, to its concentration in the metal phase would be nearly independent of concentration. It has now been discovered, however, that simple solubility effects do not always govern the distribution of solute metals between a liquid metal phase and a liquid salt phase in contact therewith.

One of the objects of the present invention is to provide a more selective process for the removal of metals from liquid metal compositions. Another object is to provide a method for removing low concentrations of metals from solution in liquid metal media. A further object is to provide a method for selectively removing metals individually from a group of metals in solution in a liquid metal medium. Other objects will be in part apparent and in part pointed out hereinafter.

In one of its broader aspects, the objects of the present invention are achieved by dissolving the metals to be separated in a liquid metal composition, forming a fused halide composition containing halides of metals which are reducing with respect to the halides of the metals of said composition, contacting said liquid metal and halide compositions, adding to said compositions an agent capable of oxidizing the metal to be removed and separating the halide and metal phases.

For the purposes of this application an agent or a halide is oxidizing with respect to a particular metal when the addition of the agent or halide to a liquid metal-liquid salt system, containing the particular metal, results in the oxidation of the metal to form a halide thereof. For the purposes of this application if the particular metal is A and its halide is AX and a second metal is B and its halide is BX, the reaction occurring in the contacted liquid metal-liquid salt phases can be written as follows:

$$A + BX \rightarrow AX + B$$

For the purpose of this application the halide AX is also termed more stable than the halide BX and correspondingly the halide BX is less stable than the halide AX. The halide AX also has a greater negative free energy of formation than BX.

It has been discovered that the ratio of the concentration of a particular metal halide in a liquid halide composition, to the concentration of the corresponding metal in a liquid metal composition, where the liquid halide and liquid metal phases are in contact, is very sensitive to changes in the degree of oxidation of the system. When the metal and its halide are present in relatively low concentrations in the two phases, transfer of the low concentration metal from solution in the liquid metal phase to the halide phase may be acomplished by careful oxidation thereof, to change the degree of oxidation of the system. This careful oxidation may be achieved by careful addition of an oxidizing agent to the contacted metal and halide phases.

I have found that a nearly quantitative transfer of low concentration metal occurs following the oxidation, although the free energy of formation of its halide is only slightly different from that of other metals present in the liquid metal phase. The following expression is useful in relating the concentrations of metals and their halides in a two phase liquid-metal, liquid-halide system:

$$R = \frac{A/AX}{B/BX}$$

In this expression A and B are the concentrations of the metals in the liquid phase and AX and BX are the concentrations of the halides of these metals in the halide phase. For a particular pair of metals and their halides the ratio R is approximately constant; that is, it is nearly independent of the absolute values of the concentrations if these are small. For a system of metals and their halide salts, the value of R is very sensitive to differences in the stabilities or free energies of formation of the halides. It has been found that the value of R for two metal chlorides, which differ in their free energies of formation by approximately 10 kilocalories per gram atom of chlorine contained, is about 1000 at about 750° K. If the two metals, A and B, are present in a liquid metal-liquid salt composition in the metal state, and the difference in free energies of formation of their chlorides is as little as 10 kilocalories per gram atom of chlorine contained, the addition of oxidant results in a nearly quantitative transfer of the metal forming the more stable chloride to the salt phase. The separation of two metal halides having smaller differences in their free energies of formation, as small as 4 kilocalories per gram atom of chlorine contained, is feasible by the present method although the separation achieved as a result of a single oxidation as noted above, is not as complete. A ten fold separation is possible at the lower difference in free energy. It is preferred to carry out the present method at the lowest temperature at which the materials are fluid because the separation factor, i.e., the value of R, decreases with increasing temperature.

The liquid metal and salt compositions may be chosen to permit the oxidation of a particular metal selectively from other metals present in low concentrations and the transfer thereof between phases. Where two metals are to be separated, a solvent metal capable of dissolving both of them is chosen and the liquid metal composition containing the metals to be separated as solute, is contacted with a fused metal composition containing halides of metals which are more stable than the metals of the liquid metal composition. An oxidizing agent is then added to selectively oxidize one of the solute metals to form a halide. Following the oxidation, the formed halide transfers to the liquid salt phase and by separating the liquid salt and liquid metal phases, the two metals are separated.

The method of the present invention may be illustrated with reference to the removal of fission product metals from solution in liquid bismuth containing uranium dissolved therein. Uranium is soluble at a concentration of approximately a few tenths of a percent in liquid bismuth at temperatures between 400 and 600° C. The irradiation of this solution in a neutron flux results in the formation of fission product metals such as cesium, barium and the rare earth metals. The concentrations in which these metals are formed depends on the neutron flux in the bismuth, the length of time of exposure and the frequency of fission product removal. Concentrations may range between one part per billion to about 1%.

It has been found possible to remove these fission product metals selectively from solution in liquid bismuth without removal of an appreciable quantity of uranium by contacting the liquid metal solution with fused halides, as for example, the halides of sodium, potassium and lithium, and by adding to the contacted phases a quantity of a halide which is unstable relative to the halides of the fission products noted above. Removal of approximately 90 to 95% of these fission products to the liquid salt is accomplished in this manner.

One oxidizing agent which is particularly useful in this connection is bismuth chloride. Bismuth chloride is an unstable halide relative to the stability of some fission product metal halides such as the rare earth halides. Bismuth chloride is also more unstable than uranium chloride and its addition must be limited to the quantity stoichiometrically equivalent to the quantity of the metals present which form more stable halides than uranium. The addition of the stoichiometric quantity is necessary to avoid transfer of appreciable quantities of uranium to the liquid salt as uranium chloride. About 90% of such fission products can be transferred without transferring more than one percent of the uranium. In the absence of uranium transfer of the metal fission products forming more stable halides than bismuth chloride can be accomplished by adding to the contacted liquid phases a quantity of bismuth chloride stoichiometrically equivalent to the quantity of such fission products present in the metal. Transfer of rare earth fission products from liquid metal to liquid salt can also be accomplished by additions of other metal halides such as lead, zirconium, manganese and aluminum. When bismuth is the liquid metal solvent, the particular virtue of bismuthchloride is that the bismuth produced becomes part of the solvent metal and thus does not introduce any foreign material into the liquid metal composition.

Although the fission product metals are present in very small concentrations, it is possible to selectively and individually remove those of the metals having appreciable differences in stability, i.e., more than 10 kilocalories per gram atom of chlorine contained, from solution in liquid metal by discrete additions of oxidizing halides in quantities stoichiometrically equivalent to the quantity of the individual fission products to be removed. The separation of such fission products is very desirable because of their different radiation properties. For example, the pure radiation product, cesium, is considered very valuable because of its utility in medical radiation treatment. As metals are separated from a group of metals dissolved in a liquid metal medium and transferred to a halide salt, it is desirable to remove the halide of the transferred metal from the liquid salt composition. For this purpose salt to which a particular component has been transferred as a halide may be separated from the first liquid metal and placed in contact with a second liquid metal composition, a reducing agent added to the newly contacted materials to cause a reduction of the particular halide and its transfer to the second liquid metal.

It has further been found that the fission product metals, particularly the rare earths, can be continuously removed from bismuth by contacting the metal with a salt of a composition providing an "oxidation buffer." For this purpose, the salt composition itself should preferably contain a component halide capable of continuously oxidizing the fission product metals as they are formed and the liquid metal compositions must contain a quantity of the metal of this component halide. With regard to the oxidizing component halide, it should preferably be intermediate in its stability between the halides of the metals to be retained in the metal phase and the halides of the metals to be removed to the salt phase. In order to maintain an oxidation buffer system, the metal of the oxidizing halide must also be present in the liquid metal.

One example of this is the continuous removal of rare earth fission product metals from a liquid bismuth composition, without removal of significant quantities of uranium, by maintaining magnesium metal present in the bismuth and magnesium chloride present in the salt, and by maintaining the ratio of the concentration of magnesium chloride present in the salt to the concentration of magnesium metal present in the metal phase at a value of about 5000. For this purpose, a salt containing 18% KCl, 24% NaCl, and 58% $MgCl_2$ may be employed. The preferred concentration of magnesium in the metal phase of about 100 parts per million or 0.01%, is maintained in order to keep the value of the ternary salt-to-metal concentration ratio $MgCl_2/Mg$, at about a value of 5000.

One advantageous result made possible by the present method is the separation of metals from metal solution although the dissolved metal is present in solution in extremely small quantities. Where appreciable solubility of the metal in the fused salt exists, the method is not useful in separating comparably small quantities of metals from solution. In one of its broader aspects, the method includes the removal of metal from metal solution by dissolving the metals in a base metal of low halide stability, contacting the metal solution with a fused halide of high halide stability and oxidizing the less noble metal to a salt in order to selectively remove metal from solution.

The use of fluorides and other halides in place of chlorides is contemplated within the scope of the present method. For example, in some systems, a metal bromide, such as, magnesium bromide, may be used to advantage.

Since many embodiments might be made of the present invention, and since many changes might be made in the embodiment described it is to be understood that the foregoing description is to be interpreted as illustrative only and not in a limiting sense.

I claim:

1. The method of separating at least some of the metal fission products of uranium from solution in a liquid bismuth composition containing uranium without removing the uranium therefrom which comprises contacting said liquid bismuth composition with a fused chloride composition containing approximately 58% magnesium chloride, 18% potassium chloride and 24% sodium chloride and maintaining in said liquid bismuth composition a magnesium metal concentration of approximately 100 parts per million and thereafter separating said liquid bismuth composition from said fused chloride composition.

2. The method of continuously removing rare earth metal fission products of uranium from solution in a liquid bismuth composition, without causing removal of more than 1% of uranium metal also dissolved therein, which comprises contacting said liquid bismuth composition with a fused salt composition containing 18% KCl, 24% NaCl and 58% MgCl$_2$, maintaining a magnesium-metal concentration in said liquid bismuth of about 100 parts per million and separating the liquid bismuth from contact with said fused salt composition.

3. In a method of treating a liquid bismuth composition containing uranium and metal fission products of uranium, to selectively remove said fission products therefrom, the steps which comprise contacting said composition with a fused chloride containing as an essential ingredient, a metal chloride which is unstable relative to the corresponding chloride of said fission product metals and which is relatively more stable than uranium chloride, said chloride being selected from the group consisting of bismuth, lead, zirconium, manganese and aluminum chlorides, maintaining in said liquid bismuth, a small proportion of, and relative to, the metal of said selected metal chloride to prevent transfer of said uranium to the liquid bismuth and thereafter separating the said contacted fused chloride from the liquid bismuth composition.

References Cited in the file of this patent

UNITED STATES PATENTS

| | | |
|---|---|---|
| 2,758,023 | Bareis | Aug. 7, 1956 |
| 2,840,464 | Wiswall | June 24, 1958 |

UNITED STATES PATENT OFFICE

CERTIFICATE OF CORRECTION

Patent No. 2,936,231  May 10, 1960

Richard H. Wiswall

It is hereby certified that error appears in the above numbered patent requiring correction and that the said Letters Patent should read as corrected below.

In the heading to the printed specification, lines 2 and 3, title of invention, for "RARE-EARTH METAL FISSION PRODUCTS FROM LIQUID U-Bi" read -- SEPARATION OF RARE-EARTH METAL FISSION PRODUCTS FROM LIQUID U-Bi --.

Signed and sealed this 20th day of December 1960.

(SEAL)
Attest:
KARL H. AXLINE
Attesting Officer

ROBERT C. WATSON
Commissioner of Patents